United States Patent [19]
Okuhara

[11] 4,078,721
[45] Mar. 14, 1978

[54] GREENHOUSE CONTROL DEVICE

[76] Inventor: Seiichi Okuhara, 3-5-7, Yoyogi, Shibuya, Tokyo, Japan, 151

[21] Appl. No.: 721,690

[22] Filed: Sep. 9, 1976

[30] Foreign Application Priority Data

Sep. 12, 1975 Japan .............................. 50-110033
Mar. 3, 1976 Japan .............................. 51-22220

[51] Int. Cl.² .......................... F24F 7/02; G05B 6/02
[52] U.S. Cl. .................................. 236/49; 236/78 C; 318/467; 318/626
[58] Field of Search ............... 236/78 C, 781, 75, 49; 318/626, 467; 47/17

[56] References Cited
U.S. PATENT DOCUMENTS

| | | | |
|---|---|---|---|
| 2,584,691 | 2/1952 | Galeazi | 236/78 C X |
| 2,695,752 | 11/1954 | Rodeck | 236/49 |
| 2,812,141 | 11/1957 | Sueda et al. | 236/49 X |
| 3,391,317 | 7/1968 | Bell | 236/78 C UX |

*Primary Examiner*—William E. Wayner
*Attorney, Agent, or Firm*—Eugene E. Geoffrey, Jr.

[57] ABSTRACT

Apparatus for controlling the opening and closing of windows in a greenhouse or other structure which includes temperature sensing means for producing a control signal, means for producing a second control signal corresponding to a temperature at which the windows are to be opened, means actuated by the windows for producing a third control signal, means comparing the third signal with the first and second signals to produce a comparison signal which functions to operate motors to open and close said windows.

1 Claim, 6 Drawing Figures

GREENHOUSE CONTROL DEVICE

This invention relates to a novel and improved greenhouse control device, and more particularly to a device of a type arranged to open and close ventilation windows of the greenhouse automatically in response to a temperature sensing element disposed in the greenhouse when the latter senses a preselected temperature.

In prior devices of this type, motors are driven to open and close the windows in response to detection of a preselected temperature by a temperature sensing element and the motors are stopped at the limits of the opening and closing operations by means of limit switches and suitable contact means. However, such limit-switching means are difficult to install and frequently get out of order.

Therefore, an object of this invention is to provide a greenhouse control device of the above type, which does not include limit switches or similar contact means. In order to attain this object, in the device of this invention, a potentiometer interlocked with each ventilation window is provided for producing a signal representing the aperture of a window.

The greenhouse control device of this invention comprises a temperature sensing element disposed in a greenhouse, means for generating a first output corresponding to a temperature sensed by said temperature sensing element, means for generating a second output corresponding to a temperature at which a ventilation window is to be opened, a potentiometer interlocked with said window for generating a third output corresponding to the aperture of said window, means for comparing the sum of said first and second outputs with said third output to produce a comparison output, relay means energized by said comparison output, and an electric motor driven through said relay means for driving said ventilation window.

Other objects and features of this invention will be described in more detail hereinunder with reference to the accompanying drawings.

In the drawings.

Throughout the drawings, like reference symbols are used to denote corresponding components.

Figure 1:
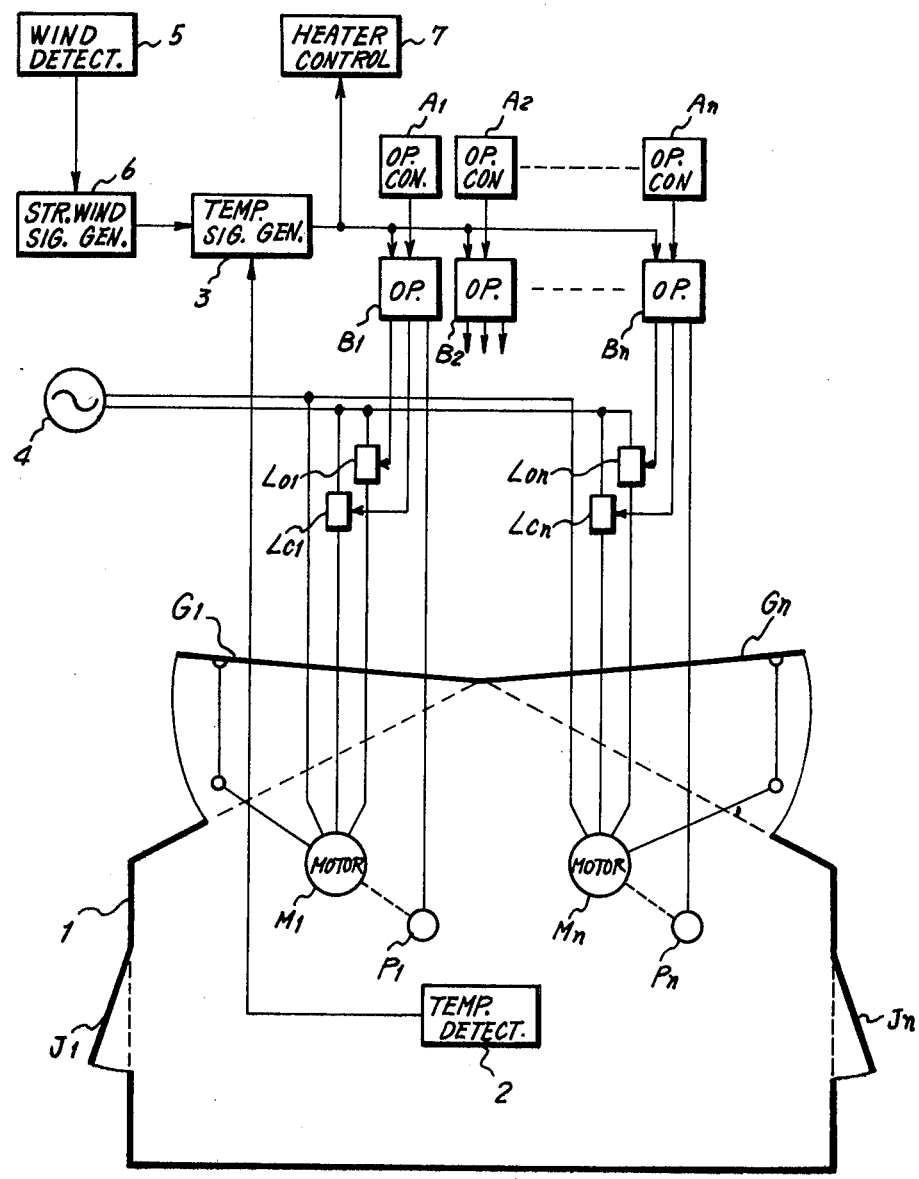
FIG. 1 is a schematic block diagram of one embodiment of the device of this invention applied to a greenhouse.

Referring first to FIG. 1, a greenhouse 1 to be controlled includes a plurality of skylight windows G1, G2, ... Gn (only G1 and Gn are shown). Although all of these windows may be controlled respectively by the device of this invention, only the windows G1 and Gn are shown to be controlled for simplification.

The greenhouse 1 also includes therein a temperature sensing element 2 of known type the output of which is connected to a temperature signal generating circuit 3, a plurality of reversible motors M1, M2, ... Mn (only M1 and Mn are shown) for driving the windows G1, G2, ... Gn, respectively, and a plurality of potentiometers P1, P2, ... Pn (only P1 and Pn are shown), which constitute one of the features of this invention. The potentiometers are interlocked with the windows G1, G2, ... Gn or the motors M1, M2, ... Mn, respectively, for producing outputs corresponding to the apertures, e.g., opening angles, of the respective windows. The motors M1, M2, ... Mn are connected to a common power supply 4 through pairs of relay switches $Lo1$ and $Lc1$, $Lo2$ and $Lc2$, ... $Lon$ are arranged to be controlled by operation circuits B1, B2, ... Bn to drive the motors M1, M2, ... Mn forwardly to open the windows G1, G2, ... Gn, respectively, while the relay switches $Lc1$, $Lc2$, ... $Lcn$ are arranged to be controlled by the same operation circuits to drive the same motors backwardly to close the same windows, respectively. The potentiometers P1, P2, ... Pn are coupled to the operation circuits B1, B2, ... Bn, respectively.

The output of the temperature signal generating circuit 2 is supplied to the operation circuits B1, B2, ... Bn as one of the control inputs thereof, another control input thereof being supplied respectively from operation control circuits A1, A2, ... An which are provided for supplying such signals as for auto-manual changeover, manual open-close switching temperature setting and aperture limiting.

Another feature of this invention is that the windows can be closed automatically regardless of temperature in case of a strong wind to prevent breakage of the windows. For this purpose, a wind detector 5 such as an anemometer is provided for detecting a speed of wind. The output of the wind detector 5 is connected to a strong-wind signal generator 6 for generating an output when the wind detector 5 senses the speed of wind above a predetermined value, the output being supplied to the temperature signal generating circuit 3 for the purpose to be described later.

As a further feature of this invention, the greenhouse can be heated up automatically when the temperature drops below a predetermined value. For this purpose, the output of the temperature signal generating circuit 3 is also applied to a heater control unit for controlling a heater unit in response to a predetermined temperature signal.

Figure 2:
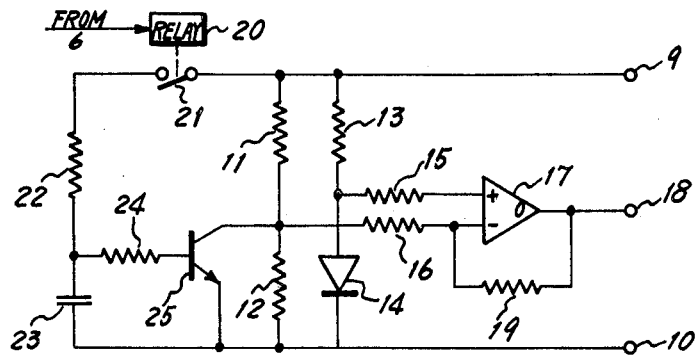
FIG. 2 is a circuit diagram of a part of the device of FIG. 1.

FIG. 2 shows an embodiment of the temperature signal generating circuit 3 of FIG. 1, in which positive and negative terminals 9 and 10, which are connected to a suitable DC source (not shown), are provided and a series connection of resistors 11 and 12 and a series connection of a resistor 13 and a diode 14 are connected in parallel between these terminals. The diode 14 is a silicon diode which serves the function of the temperature detecting element 2 of FIG. 1. The junction of the resistors 11 and 12 is connected through a resistor 16 to the inversive input "-" of an operation amplifier 17 and the junction of the resistor 13 and the diode 14 is connected through a resistor 15 to the non-inversive input "+" of the same operation amplifier. The output "0" of the operation amplifier 17 is connected to an output terminal 18 of the circuit. A resistor 19 is connected between the inversive input and the output of the operation amplifier 17 to provide a negative feedback path.

The output of the strong-wind signal generator 6 of FIG. 1 is applied to a relay 20 having a normally-open switch 21 which is connected in series with a time-constant circuit consisting of a resistor 22 and a capacitor 23 between both terminals 9 and 10. The junction of the resistor 22 and the capacitor 23 is connected through a resistor 24 to the base of a transistor 25 having a collector-to-emitter path connected across the resistor 12.

Figure 3:
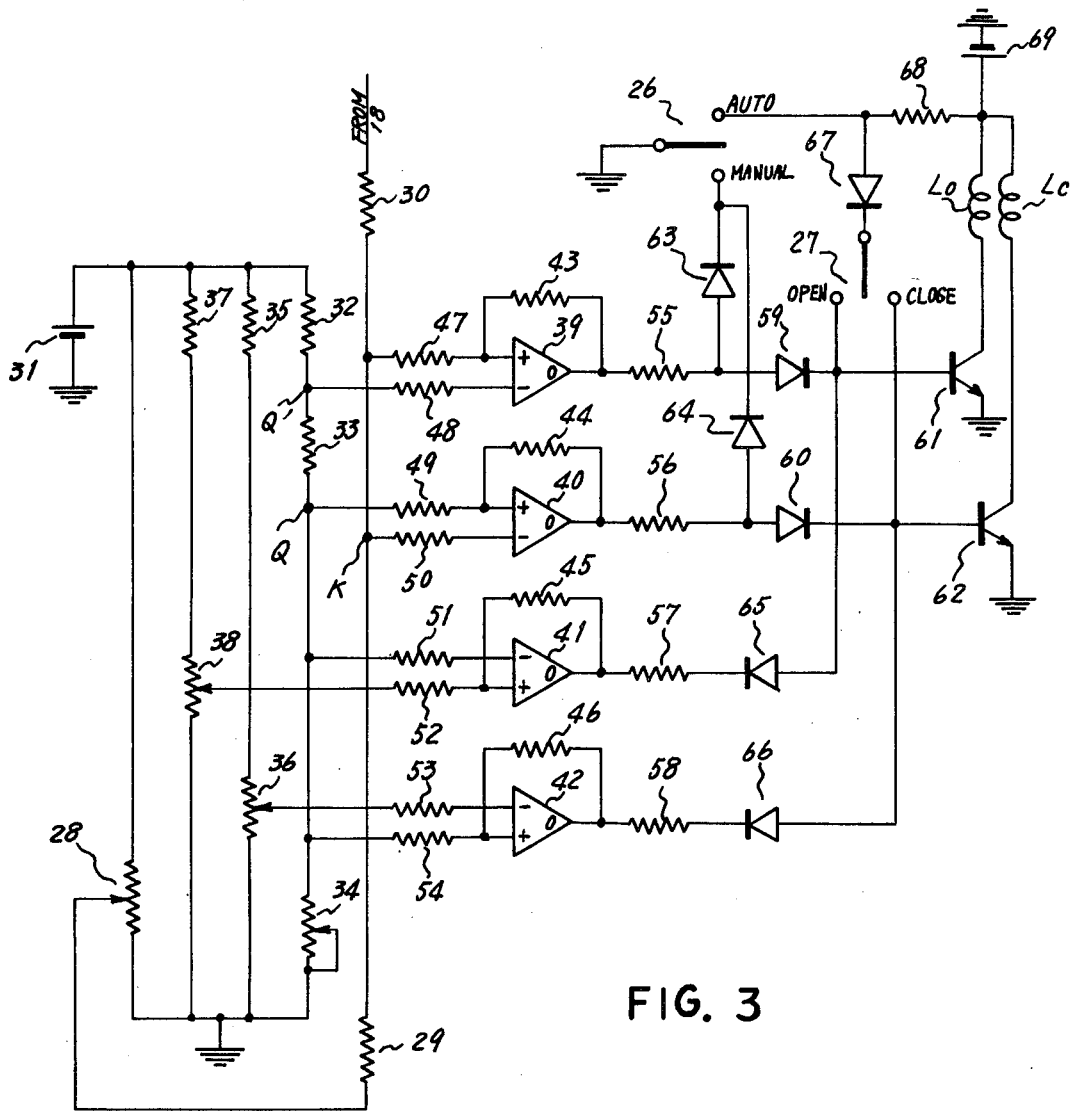
FIG. 3 is a circuit diagram of another part of the device of FIG. 1.

FIG. 3 shows only one set of the operation control circuits and the operation circuit accompanied with a pair of relays Lo and Lc which correspond to a corresponding pair of Lo1 and Lc1, Lo2 and Lc2, ... Lon and Lcn. As the other sets are exactly the same as this set, they are omitted from the description for the purpose of simplification.

The operation control circuit A of FIG. 1 includes an auto-manual changeover switch 26, a manual open-close changeover switch 27 and a temperature preset potentiometer 28. The movable arm of the potentiometer 28 is connected through resistors 29 and 30 to the output terminal 18 of the temperature signal generating circuit 3 (FIGS. 1 and 2), and both fixed terminals thereof are connected respectively to a DC source 31 and the ground. In parallel with the potentiometer 28, there are connected a first series connection of resistors 32 and 33 and a potentiometer 34, a second series connection of a resistor 35 and a potentiometer 36 and a third series connection of a resistor 37 and a potentiometer 38. The potentiometer 34 corresponds to one of the potentiometers P1, P2, ... Pn of FIG. 1 and its movable arm is interlocked with the corresponding window.

The circuit also includes four comparators 39, 40, 41 and 42 for generating window opening signals, window closing signals, maximum aperture signals and minimum aperture signals, respectively. Resistors 43, 44, 45, and 46 are respectively connected between the non-inversive inputs and the outputs of these comparators for providing them with hysteresis. These comparators may be operation amplifiers of conventional type in which a positive output is produced when the non-inversive input is higher than the inversive input and a negative output is produced when the inversive input is higher than the non-inversive input.

The junction K of the resistors 29 and 30 is connected through a resistor 47 to the non-inversive input of the comparator 39 and also connected through a resistor 50 to the inversive input of the comparator 40. The inversive input of the comparator 39 is connected through a resistor 48 to the junction Q' of the resistors 32 and 33 and the non-inversive input of the comparator 40 is connected through a resistor 49 to the junction Q of the resistor 33 and the potentiometer 34.

The junction Q is also connected through a resistor 51 to the inversive input of the comparator 41 and further connected through a resistor 54 to the non-inversive input of the comparator 42. The non-inversive input of the comparator 41 is connected through a resistor 52 to the movable arm of the potentiometer 38 and the inversive input of the comparator 42 is connected through a resistor 53 to the movable arm of the potentiometer 36.

The opening signal at the output "0" of the comparator 39 is connected through a resistor 55 and a diode 59 to the base of a transistor 61 having a collector-to-emitter path which is connected through the opening relay Lo to a DC source 69, while the closing signal at the output "0" of the comparator 40 is connected through a resistor 56 and a diode 60 to the base of a transistor 62 having a collector-to-emitter path which is connected through the closing relay Lc to the source 69.

The output of the comparator 39 is also connected through the resistor 55 and a diode 63 to the MANUAL contact of the auto-manual changeover switch 26 and the output of the comparator 40 is also connected through the resistor 56 and a diode 64 to the same contact. The movable arm of the switch 26 is grounded and the AUTO contact thereof is connected through a diode 67 to the movable arm of the manual open-close changeover switch 27 and also connected through a resistor 68 to the DC source 69.

The maximum aperture signal at the output "0" of the comparator 41 is connected through a current limiting resistor 57 and a backward diode 65 to the base of the transistor 61 and OPEN contact of the switch 27 and the minimum aperture signal at the output "0" of the comparator 42 is connected through a resistor 58 and a backward diode 66 to the base of the transistor 62 and CLOSE contact of the same switch.

Figure 4:
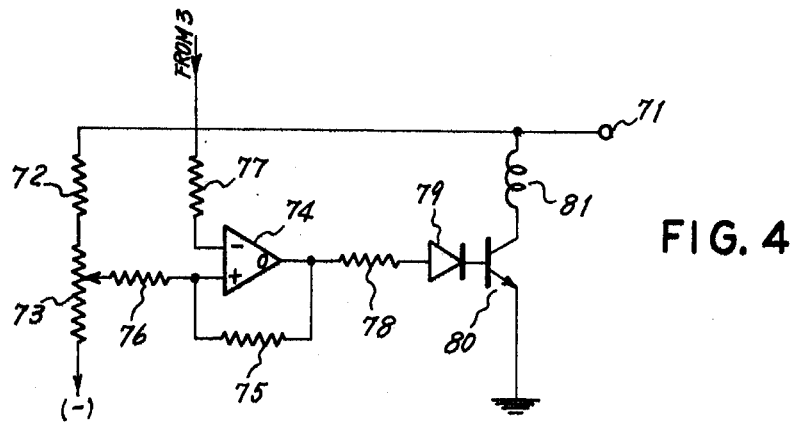
FIG. 4 is a circuit diagram of a further part of the device of FIG. 1.

FIG. 4 shows an embodiment of the heater control circuit 7 of FIG. 1. A source terminal 71 which is to be connected to the (+) side of the DC source (not shown), is connected through a resistor 72 and a potentiometer 73 to the (−) side. The non-inversive input of a comparator 74 having a feedback resistor 75 is connected through a resistor 76 to a movable arm of the potentiometer 73 and the output of the comparator 74 is connected through a current limiting resistor 78 and a diode 79 to the base of the transistor 80 having a collector-to-emitter path which is connected in series with a heater control relay 81 between the source terminal 71 and the ground.

Now, the operation of the above circuits will be described with reference to FIGS. 1, 2, 3, and 4.

The silicon diode 14, the forward voltage of which has a temperature gradient of about $-2$ m$^V$/° C, constitutes a bridge circuit with the resistors 11, 12, and 13 and produces an unbalanced output. The unbalanced output is amplified by the operation amplifier 17 and applied to the resistor 30. The amplification factor of the operation amplifier 17 is determined by the values of the input resistor 16 and negative feedback resistor 19 and is previously arranged so that the output voltage at the output terminal 18 varies by 0.1 volt per one degree of centigrade and becomes $-3$ volts at 0° C and zero volts at 30° C.

When the movable arm of the auto-manual changeover switch 26 is turned to AUTO contact, the output voltage at the terminal 18 is added at the junction K with the output of the potentiometer 28. When the temperature sensed by the temperature detecting element 2 is equal to the value which is preset by the potentiometer 28, the voltage at the junction K is zero. When the detected temperature is higher than the preset value, the voltage at the junction K varies in the positive direction, while, when the former is lower than the latter, the voltage at the junction K varies in the negative direction.

In addition, the voltage at the junction Q, at which the potentiometer 34 coupled to the window produces an output, is low or zero when the window is closed, but it increases in the positive direction with the aperture of the window when the window is opened.

Accordingly, the voltage at the junction Q becomes higher than the volt age at the junction K when the temperature sensed in the greenhouse drops below the present value, so that the comparator 40 for generating the closing signal produces a positive output and the output is applied through the resistor 56 and the diode 60 to the base of the transistor 62 to drive it into conduction, whereby the closing relay Lc is energized to drive the motor (not shown) backwardly to close the window. In this case, as the voltage at the junction K is lower than the voltage at the junction Q', the comparator for generating the opening signal produces a negative output which is blocked by the diode 59 and does not reach the base of the transistor 61.

When the window is closed, the resistance of the potentiometer 34 which is interlocked with the window drops to lower the voltage at the junction Q. When the voltage at the junction Q drops below the voltage at the junction K, the positive output of the comparator 40 becomes negative and the negative output is blocked by the diode 60. Therefore, the transistor is shut off to de-energize the relay Lc and stop the motor.

When the window is closed by the motor to the minimum aperture with further reduction of temperature, the voltage at the junction Q drops below the output of the potentiometer 36 and the comparator 42 for generating the minimum aperture signal produces a negative output. This negative output is applied through the resistor 58 and the backward diode 66 to the base of the transistor 62 to cancel the positive voltage which is previously applied thereto. Therefore, the transistor 62 is shut off to de-energize the relay Lc to stop the motor, thereby inhibiting an additional closure of the window even if the sensed temperature is lower than the preset one.

When the temperature sensed by the detecting element 2 becomes higher than the value preset by the potentiometer 28 with the same arrangement, the voltage at the junction K rises above the voltage at the junction Q' and the comparator 39 for generating the opening signal produces a positive output. This positive output is applied through the resistor 55 and the capacitor 59 to the base of the transistor 61 to drive it into conduction, whereby the opening relay Lo is energized to drive the motor forwardly to open the window.

As the voltage at the junction K is higher than that at the junction Q in this case, the comparator 40 produces a negative output which is blocked by the capacitor 60 and never reaches the base of the transistor 62.

With the opening of the window, the resistance of the potentiometer 34 increases to raise the voltage at the junction Q'. When the voltage at the junction Q' becomes higher than that at the junction K, the output of the comparator 39 goes from positive to negative output is blocked by the capacitor 59, so that the transistor is shut off to de-energize the relay Lo to stop the motor.

When the window is opened to the maximum aperture with further increase of the temperature, the voltage at the junction Q rises above the output of the potentiometer 38 and the comparator 41 produces a negative output. This negative output is applied through the resistor 57 and the backward diode 65 to the base of the transistor 61 to cancel the positive voltage previously applied thereto. Therefore, the transistor is shut off to de-energize the relay Lo to stop the motor and inhibiting further opening of the window even if the temperature is higher than the preset value.

As the movable arm of the switch 26 is grounded, when the movable arm is moved to the AUTO contact, no positive voltage is applied to the bases of the transistors 61 and 62 even if the movable arm of the switch 27 is moved to either the OPEN contact or the CLOSE contact. The diode 67 serves the function of preventing the outputs of the comparators 39 and 40 from being grounded through the switch 27 when the movable arm of the switch 26 is moved to the AUTO position.

In the case of effecting automatic control of the window, if the value of the resistor 33 is selected small, the inputs of the both comparators 39 and 40 are substantially equal and the comparators 39 and 40 respond sensitively to the voltage changes at the junction K and the junctions Q and Q' and produce positive outputs alternately at their output terminals "0". However, if the value of the resistor 33 is large, the comparators 39 and 40 do not produce prositive outputs provided the voltage change at the junction K does not exceed the voltage across the resistor 33, thereby providing a so-called "insensitive zone". Accordingly, the "insensitive zone", which is a temperature range in which neither the relay Lo nor the relay Lc can be energized, can be arbitrarily selected by selecting the value of the resistor 33.

The window can be manually controlled regardless of the temperature by turning the movable arm of the switch 26 to MANUAL position. In this case, the outputs of the comparators 39 and 40 are grounded through the resistors 55 and 56, the diodes 63 and 64 and the switch 26.

In the above condition, if the movable arm of the switch 27 is moved to the OPEN position, a positive voltage is applied from the DC source 69 through the resistor 68, the diode 67 and the switch 27 to the base of the transistor 61 to drive it into conduction, thereby energizing the relay Lo to open the window in the same fashion as described above. Similarly, when the movable arm of the switch 27 is moved to the CLOSE position, the positive voltage is applied to the base of the transistor 62 to close the window.

It is clear that the comparators 41 and 42 are still active even when the movable arm of the switch 26 is moved to the MANUAL position and, in cooperation with the potentiometer 34 interlocked with the window, produce negative outputs to shut off the transistors 61 and 62, respectively, when the maximum and minimum apertures are reached, as in the case of automatic operation.

In the case of automatic operation wherein the movable arm of the switch 26 is moved to the AUTO position, if the wind detector 5 detects a strong wind and the strong-wind signal generator 6 generates an output (FIG. 1), this output is applied to the relay 20 (FIG. 2). This results in a closure of the normally-open switch 21 and the capacitor 23 is charged up gradually through the resistor 22. The gradually increasing voltage across the capacitor 23 is applied through the resistor 24 to the base of the transistor 25 to gradually reduce the impedance of the collector-to-emitter path of the transistor 25. Accordingly, the output of the operation amplifier 17 varies in the same manner as in the case wherein the detected temperature decreases, and the window or windows are closed in the same fashion as described above. The function of the capacitor 23 is to change the output voltage of the operation amplifier 17 gradually. Such gradual change of the voltage at the terminal 18 can prevent simultaneous energization of all of the closing relays Lc1, Lc2, . . . Lcn and consequent simultaneous start of the all motors M1, M2, . . . Mn (FIG. 1) which results in an excess total starting current. When the strong wind is over, the strong-wind signal from the strong-wind signal generator 6 is removed to de-energize the relay 20. Accordingly, the switch 21 is opened and the capacitor 23 is discharged through the resistor 24 and the base-emitter path of the transistor 25. This results in a gradual increase of the impedance of the collector-to-emitter path of the transistor 25 and the output of the operation amplifier 17 restores the voltage which corresponds to the sensed temperature. Therefore, the windows G1, G2, ... Gn are successively opened from that corresponding to the lowest preset temperature. Thus, in this case also, simultaneous start of the all motors can be prevented.

The temperature signal voltage from the temperature signal generator 3 is also applied to the heater control 7, that is, to the resistor 77 of FIG. 4. This voltage is compared with the preset voltage at the movable arm of the potentiometer 73 by the comparator 74 and, if the former is lower than the latter due to very low temperature, the comparator 74 produces a positive output. This output is applied through the resistor 78 and the diode 79 to the base of the transistor 80 to drive it into conduction, thereby energizing the relay 81 for starting operation of the heater unit (not shown). If the temperature increases and the input temperature signal voltage becomes higher than the reset voltage of the potentiometer 73, the comparator 74 produces a negative output which is blocked by the capacitor 79, thereby the transistor 80 is shut off and the relay 81 is de-energized to stop the heater unit.

The above description has been made in conjunction with the system as shown in FIG. 1, in which a plurality of motors M1, M2, ... Mn, respectively, and the motors are controlled by a plurality of operation circuits B1, B2, ... Bn, respectively by means of only one temperature detecting element 2. However, it should be easily understood by those skilled in the art that the system is applicable to such modifications in which all windows are driven by their respective motors or a single motor simultaneously controlled by a single operation circuit. Although, in this case, the operation circuit and operation control circuit as shown in FIG. 3 may, of course, be used, the circuit configuration can be simplified as follows.

Figure 5:
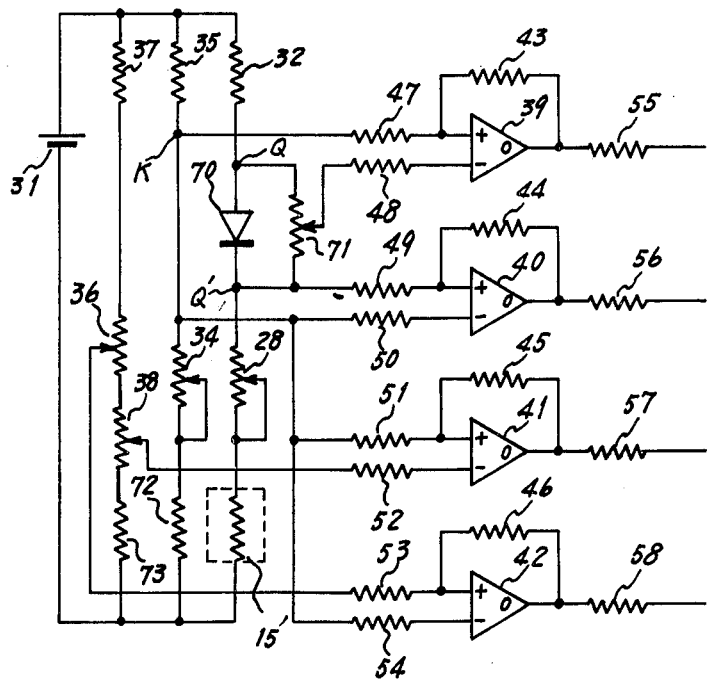
FIG. 5 is a circuit diagram of a variation of the circuit of FIG. 2.

FIG. 5 shows a modification of the lefthand half of the circuit of FIG. 3. In FIG. 5, a first series connection consisting of a resistor 32, a diode 70, a potentiometer 28 for temperature presetting and a thermister 15′ which is another embodiment of the temperature detecting element 2 of FIG. 1, a second series connection consisting of a resistor 35, a potentiometer 34 interlocked with the window or windows and a resistor 72 and a third series connection consisting of a resistor 37, potentiometers 36 and 38 and a resistor 73 are connected in parallel across a DC source 31 to form a pair of bridge circuits.

The junction K of the resistor 35 and the potentiometer 34 is connected through a resistor 47 to the non-inversive input of the comparator 39, through a resistor 50 to the inversive input of the comparator 40, through a resistor 51 to the non-inversive input of the comparator 41 and through a resistor 54 to the inversive input of the comparator 42. The movable arm of the potentiometer 38 is connected through a resistor 52 to the inversive input of the comparator 41 and the movable arm of the potentiometer 36 is connected through a resistor 53 to the non-inversive input of the comparator 42. A potentiometer 71 is connected across the diode 70 to form junctions Q and Q′ and the movable arm of the potentiometer 71 is connected through a resistor 48 to the inversive input of the comparator 39. The junction Q′ is connected through a resistor 49 to the non-inversive input of the comparator 40. The connection in the righthand side from the comparators 39, 40, 41, and 42 is exactly the same as that of FIG. 3.

In the case of automatic operation, if the sensed temperature is lower than the preset temperature, the resistance of the thermister 15′ is large and the voltage at the junction Q′ becomes higher than the voltage at the junction K. This causes the comparator 40 to produce a positive output to close the window as in the case of FIG. 3. Although the comparator 39 produces a negative output at the same time, this output is blocked by the diode 59 (FIG. 3). With closure of the window, the resistance of the interlocked potentiometer 34 increases to raise the voltage at the junction K above that at the junction Q′. Accordingly, the output of the comparator 40 is turned from positive to negative and blocked by the diode 60 (FIG. 3) to stop the motor.

When the temperature drops further and the ventilation window is closed by the motor to the minimum aperture, the voltage at the junction K rises above the output of the potentiometer 36 and the comparator 42 produces a minimum aperture signal of negative polarity. As in the case of FIG. 3, this negative voltage is applied to the base of the transistor 62 to cancel the positive voltage which has been applied thereto, thereby stopping the motor to prevent the window from being further closed even if the temperature is lower than the preset temperature.

If the sensed temperature is higher than the preset temperature, the resistance of the thermister 15′ becomes small and the voltage at the junction Q′ becomes lower than the voltage at the junction K. This causes the comparator 39 to produce a positive output to open the window as in the case of FIG. 3, if the movable arm of the potentiometer 71 is close to the junction Q′. Although the comparator 40 produces a negative output at the same time, this output is blocked by the diode 60 (FIG. 3). With opening of the window, the resistance of the potentiometer 34 decreases to reduce the voltage at the junction K below that of the movable arm of the potentiometer 71. Accordingly, the output of the comparator 39 is turned from positive to negative and blocked by the diode 59 (FIG. 3) to stop the motor.

If the temperature rises further and the window is opened to the maximum aperture, the voltage at the junction K drops below the output of the potentiometer 38 and the comparator 41 produces a maximum aperture signal of negative polarity. As in the case of FIG. 3, this negative output is applied to the base of the transistor 61 to cancel the positive voltage applied previously thereto, thereby stopping the motor to prevent the window from being further opened even if the sensed temperature is higher than the preset value.

If the movable arm of the potentiometer 71 is close to the junction Q′, the inputs of the comparators 39 and 40 are nearly equal and the comparators 39 and 40 respond sensitively to the voltage change of the junctions K and q″ to produce positive outputs alternately. When the movable arm of the potentiometer 71 is close to the junction Q, the comparators 39 and 40 produce no positive output as long as the voltage difference between the junctions K and Q′ does not exceed the voltage across the diode 70. This provides a so-called "insensitive zone" as in the case of FIG. 3, and the insensitive zone can be adjusted arbitrarily by adjusting the movable arm of the potentiometer 71. As occasion demands, moreover, the diode 70 may be omitted.

Figure 6:
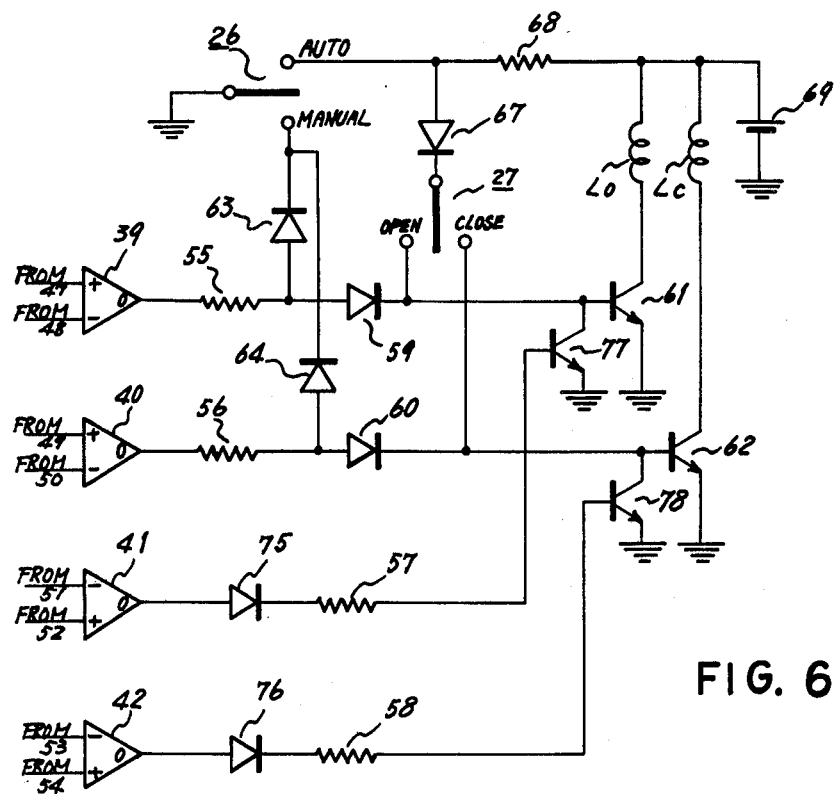
FIG. 6 is a circuit diagram of another variation of the circuit of FIG. 2.

FIG. 6 shows a variation of the right hand half of the circuit of FIG. 3. In this variation, the inversive and non-inversive inputs of the comparators 41 and 42 are interchanged and, in this variation, these comparators produce positive outputs whereas they produce negative outputs in the circuit of FIG. 3. The collector-toemitter paths of two transistors 77 and 78 are respectively connected across the base-emitter paths of the transistors 61 and 62. The output of the comparator 41 is connected through a forward diode 75 and a resistor 57 to the base of the transistor 77 and the output of the comparator 42 is connected through a forward diode 76 and a resistor 58 to the base of the transistor 78.

If the comparator 41 and 42 produces a positive output when the transistor 61 or 62 is in conduction, this output is applied to the base of the transistor 77 or 78 to drive said transistor into conduction, thereby grounding the base of the transistor 61 or 62 to shut off its conduction.

What is claimed is:

1. A greenhouse control device, comprising a temperature sensing element disposed in a greenhouse, a ventilation window, means for generating a first output corresponding to a temperature sensed by said temperature sensing element, means for generating a second output corresponding to a temperature at which the ventilation window is to be opened, means interlocked with said ventilation window for generating a third output corresponding to the aperture of said ventilation window, means for comparing a sum of said first and second outputs with said third output to produce a comparison output, relay means energized by said comparison output, an electric motor driven through said relay means for driving said ventilation window, means for generating fourth and fifth outputs respectively corresponding to the maximum and minimum apertures of said ventilation window, means for comparing said fourth and fifth outputs with said third output to produce comparison outputs, and means for inhibiting energization of said relay means in response to said comparison.

* * * * *